April 5, 1966   J. J. McWILLIAMS   3,243,857
METHOD OF AND MEANS FOR CONNECTING LIQUID CONVEYING HOSES
Filed Oct. 31, 1963   2 Sheets-Sheet 1

INVENTOR.
John J. McWilliams
BY
Arthur L. Whinston
ATTORNEY

INVENTOR.
John J. McWilliams
BY
ATTORNEY

United States Patent Office 3,243,857
Patented Apr. 5, 1966

3,243,857
METHOD OF AND MEANS FOR CONNECTING
LIQUID CONVEYING HOSES
John J. McWilliams, Leamington Spa, England, assignor to The North British Rubber Company Limited, Edinburgh, Scotland, a corporation of Scotland
Filed Oct. 31, 1963, Ser. No. 320,385
1 Claim. (Cl. 24—81)

The present invention relates to a method of, and means for, connecting liquid conveying hoses or pipes and more particularly to a method of, or means for, connecting hoses or pipes, as are used for loading and unloading oil, and are capable of being floated on the sea.

The main object of the present invention is to provide a method of and means for holding a pair of hoses or pipes, at least one of which is a liquid conveying hose or pipe, in spaced, substantially parallel, relationship.

A further object of the invention is to provide connecting means, as referred to above, which are easily replaceable and lubricated by the natural action of water.

Another object of the invention is to provide connecting means, as referred to above, of materials which are flexible and capable of withstanding tensile and shear loads, and are also impervious to, and not affected by, salt water.

The present invention consists in a method of connecting hoses or pipes comprising the steps of, positioning at least two hoses in spaced, substantially parallel relationships, passing a flexible belt around both hoses with the extremities of the belt overlying each other so that the hoses are positioned within a single loop formed by said belt and passing connecting means through the overlying belt extremities and through the opposite run of the loop to maintain the hoses in the required relationship.

The invention further consists in means for connecting hoses or pipes in spaced, substantially parallel relationship comprising at least one flexible belt passing around the hoses with the extremities thereof overlying each other so that the hoses are positioned within a single loop formed by the belt and connecting means passing through the overlying belt extremities and through the opposite run of the loop to maintain the hoses in the required relationship.

Figure 1:
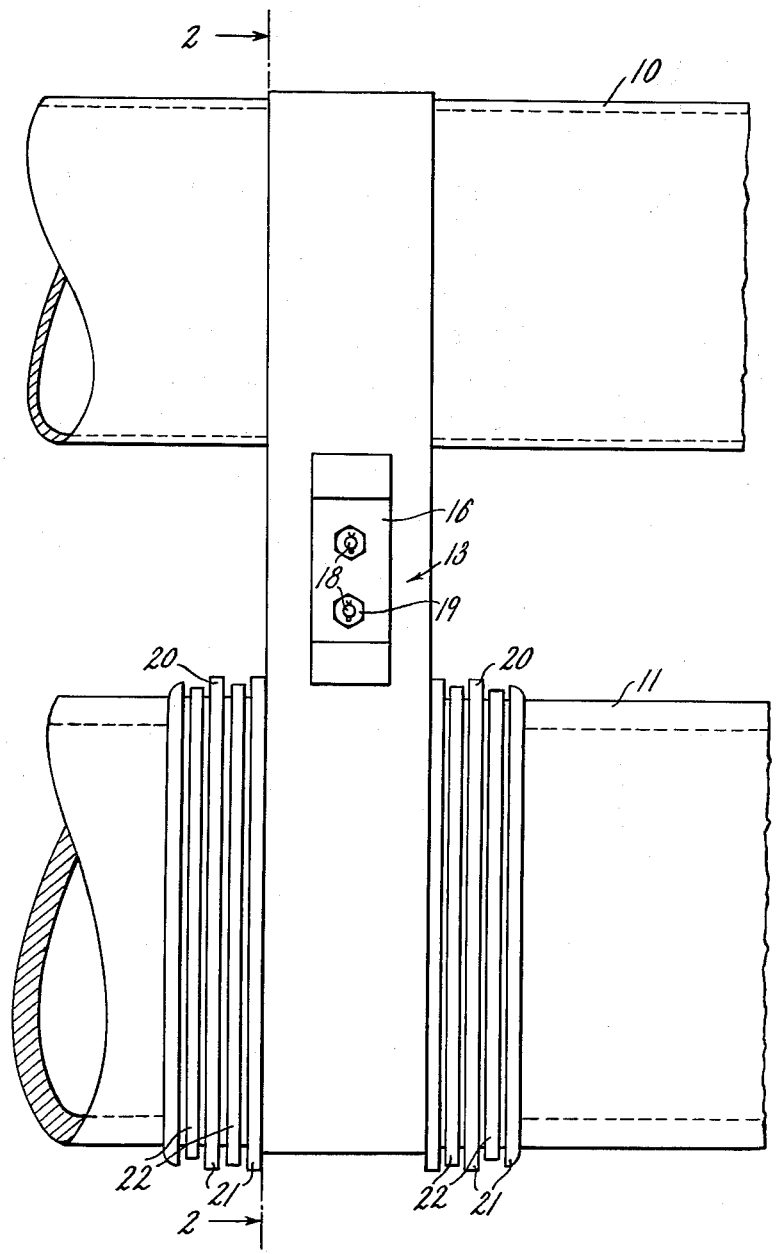
FIGURE 1 is an elevation of the connecting means according to the present invention shown connecting two hoses in spaced, parallel relationship.
Figure 2:
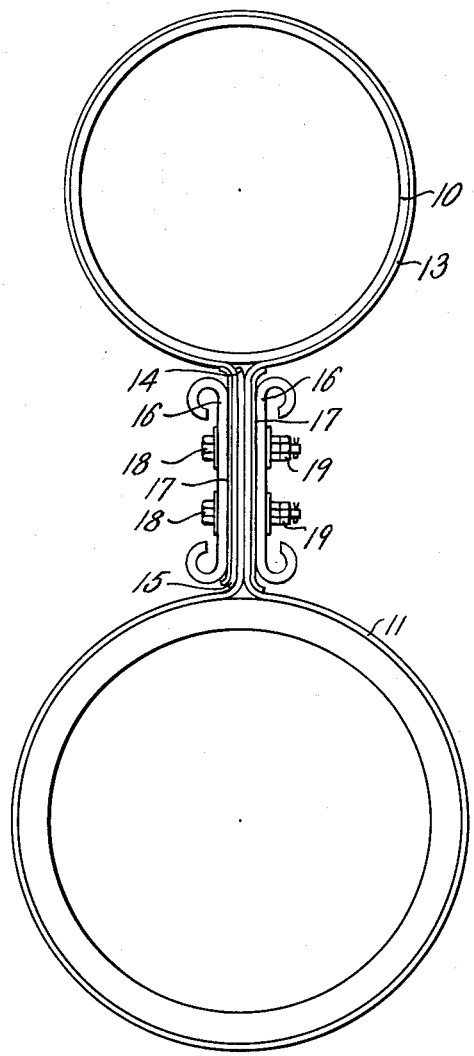
FIGURE 2 is a cross-sectional view taken on the line 2—2 of FIGURE 1.

In carrying the invention into effect according to one convenient mode, as shown in FIGURES 1 and 2 by way of example, the hoses 10 and 11 to be joined may be of any suitable construction and positioned substantially parallel to one another in either vertical or horizontal planes. For convenience, the present embodiment will be described as applied to hoses positioned in a vertical plane, the hose 10 being an air hose and the hose 11 a liquid conveying hose.

Members connecting the hoses are spaced at suitable distances from one another along the length of the hoses 10 and 11 and each member comprises a strap or belt 13 having an inner laminate of nylon or other suitable fabric which is completely enveloped by an outer covering of rubber.

In order to join the hoses 10 and 11 together, the belt 13 is passed around the hoses so that they are both positioned within a single loop formed by the belt and the extremities 14, 15 of the latter overlie each other at a position which is centrally disposed between the two hoses.

Metal reinforcement members 16 are positioned opposite each other on the outer surfaces of the belt 13 and in alignment with the overlying belt ends 14, 15. A rubber insert 17 is positioned between each member 16 and the outer surface of the belt 13. Bolts 18 are passed through both reinforcement members 16 so that the extremities of the belt 14, 15 are connected together and when a nut 19 is screwed along each bolt thread, the belt assumes a figure 8 configuration as shown in FIGURE 2, with the air hose 10 positioned in the upper loop and the liquid conveying hose 11 positioned in the lower loop of the "8."

The lower loop of the belt is maintained in a predetermined position on the liquid conveying hose 11 by means of rubber sleeves 20 positioned around the hose 11 on each side of the belt 13. Each sleeve 20 is provided with at least one circumferentially extending slot 21 in which a stainless steel tightening band 22 is accommodated.

Having thus described my invention, what I claim and desire to protect by Letters Patent is:

Means for connecting hoses in spaced, substantially parallel relationship comprising; at least one belt passing around the hoses with the extremities thereof overlying each other so that the hoses are positioned within a single loop formed by the belt, said belt being flexible and adapted to conform to any desired hose contour; opposed reinforcing members positioned on the outer surfaces of the belt between the hoses and in alignment with the overlying belt ends, said reinforcing members having ends which curl inwardly away from said hoses; rubber insert means located between each reinforcing member and the adjacent outer belt surfaces; and connecting means for holding said reinforcing members in close proximity with said belt ends and said insert means clamped tightly therebetween.

References Cited by the Examiner
UNITED STATES PATENTS

| | | | |
|---|---|---|---|
| 789,830 | 5/1905 | Zetterlund | 248—61 |
| 1,205,374 | 11/1916 | Marcus. | |
| 1,519,018 | 12/1924 | Boudreau. | |
| 1,760,323 | 5/1930 | Shelton. | |
| 1,804,775 | 5/1931 | Hull et al. | 248—61 |
| 2,089,940 | 8/1937 | Brown. | |
| 2,091,916 | 8/1937 | Evans | 24—19 |
| 2,219,399 | 10/1940 | Ritzert et al. | 24—33 |
| 2,799,907 | 7/1957 | Kohtz. | |
| 2,809,066 | 10/1957 | Curtis | 24—19 X |
| 2,893,007 | 7/1959 | Dewindt | 24—33 X |
| 2,971,538 | 2/1961 | Brumbach | 138—111 |

WILLIAM FELDMAN, *Primary Examiner.*
DONLEY J. STOCKING, *Examiner.*